No. 735,049. PATENTED AUG. 4, 1903.
J. P. APPLEBY.
MOLDING MACHINE.
APPLICATION FILED OCT. 24, 1902.
NO MODEL. 3 SHEETS—SHEET 3.

Witnesses.
H. D. Kilgore
A. H. Opsahl

Inventor.
James P. Appleby,
By his Attorneys,
Williamson & Merchant

No. 735,049. Patented August 4, 1903.

UNITED STATES PATENT OFFICE.

JAMES P. APPLEBY, OF HOPKINS, MINNESOTA.

MOLDING-MACHINE.

SPECIFICATION forming part of Letters Patent No. 735,049, dated August 4, 1903.

Application filed October 24, 1902. Serial No. 128,605. (No model.)

*To all whom it may concern:*

Be it known that I, JAMES P. APPLEBY, a citizen of the United States, residing at Hopkins, in the county of Hennepin and State of Minnesota, have invented certain new and useful Improvements in Molding-Machines; and I do hereby declare the following to be a full, clear, and exact description of the invention, such as will enable others skilled in the art to which it appertains to make and use the same.

My present invention relates to molding-machines of the general character disclosed and claimed in my prior patent of the United States, No. 707,535, issued of date August 26, 1902, and has for its object to improve the same in the several particulars hereinafter noted.

The invention consists of the novel devices and combinations of devices hereinafter described, and defined in the claims.

The invention is illustrated in the accompanying drawings, wherein like characters indicate like parts throughout the several views.

Figure 1:
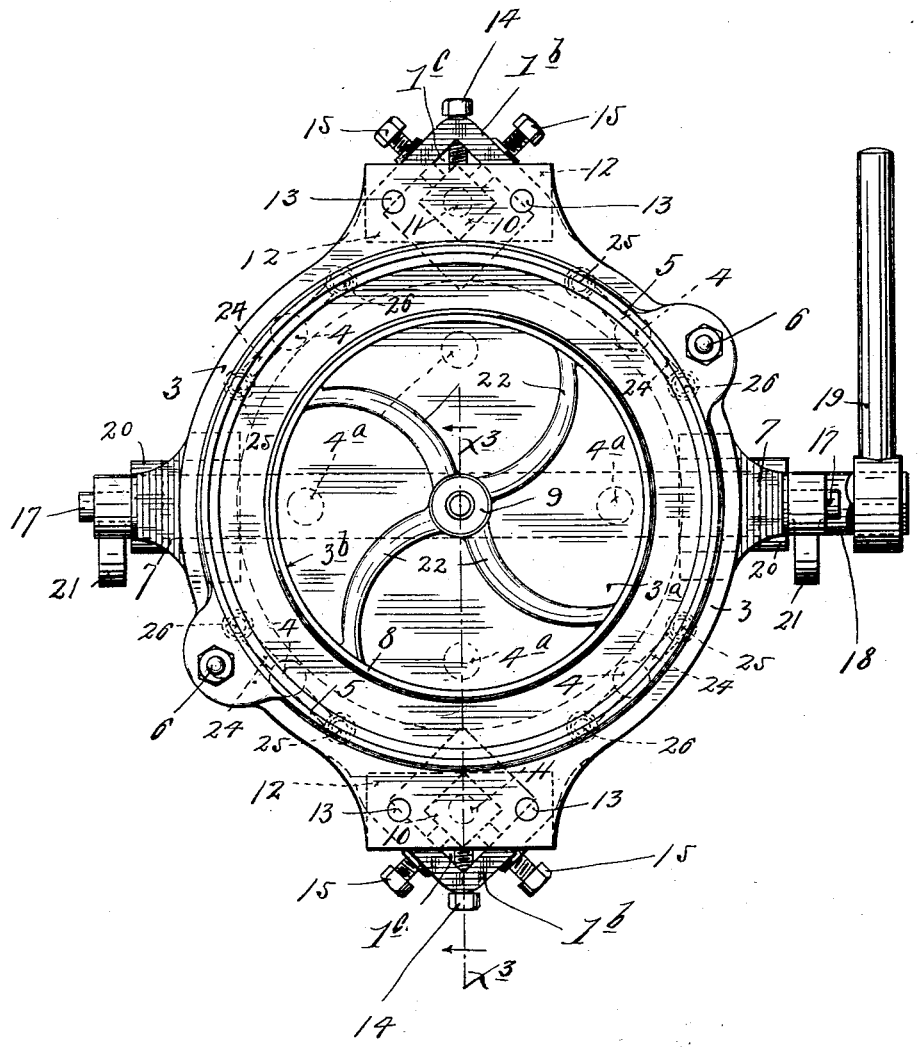
Figure 2:
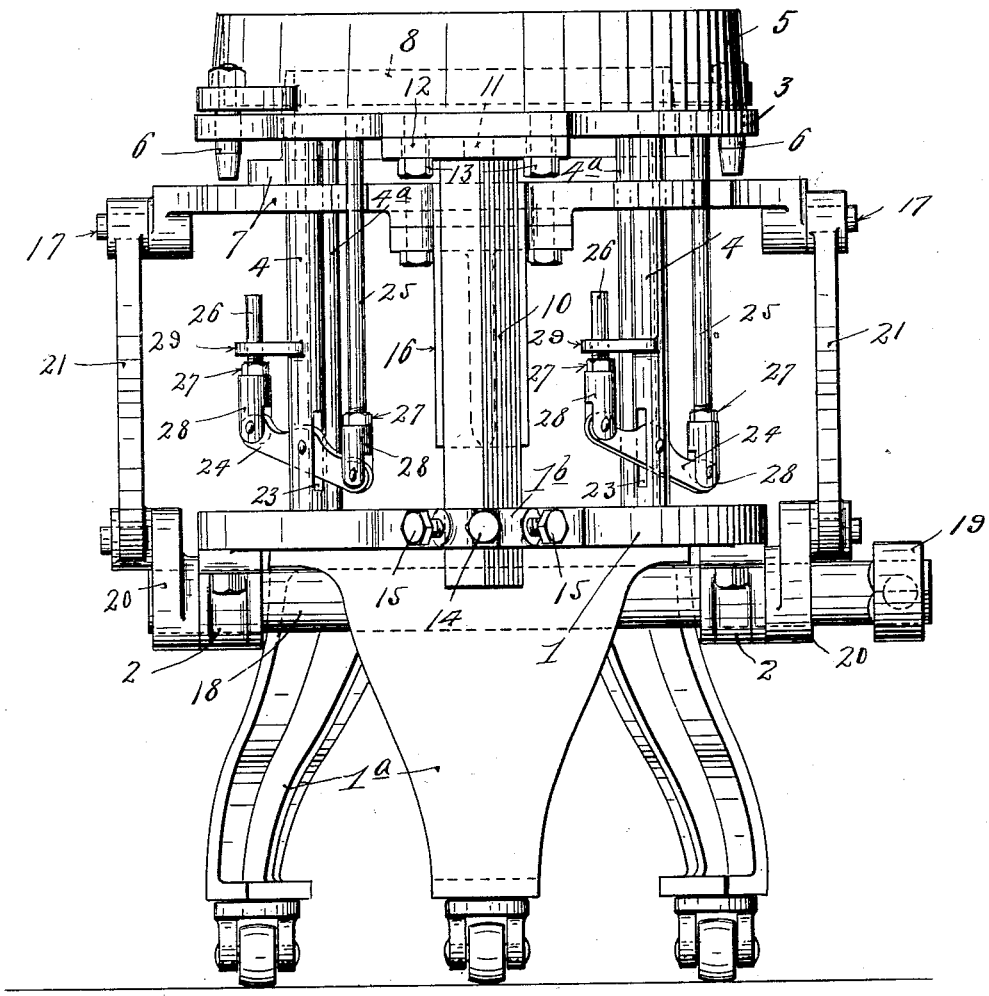
Figure 3:
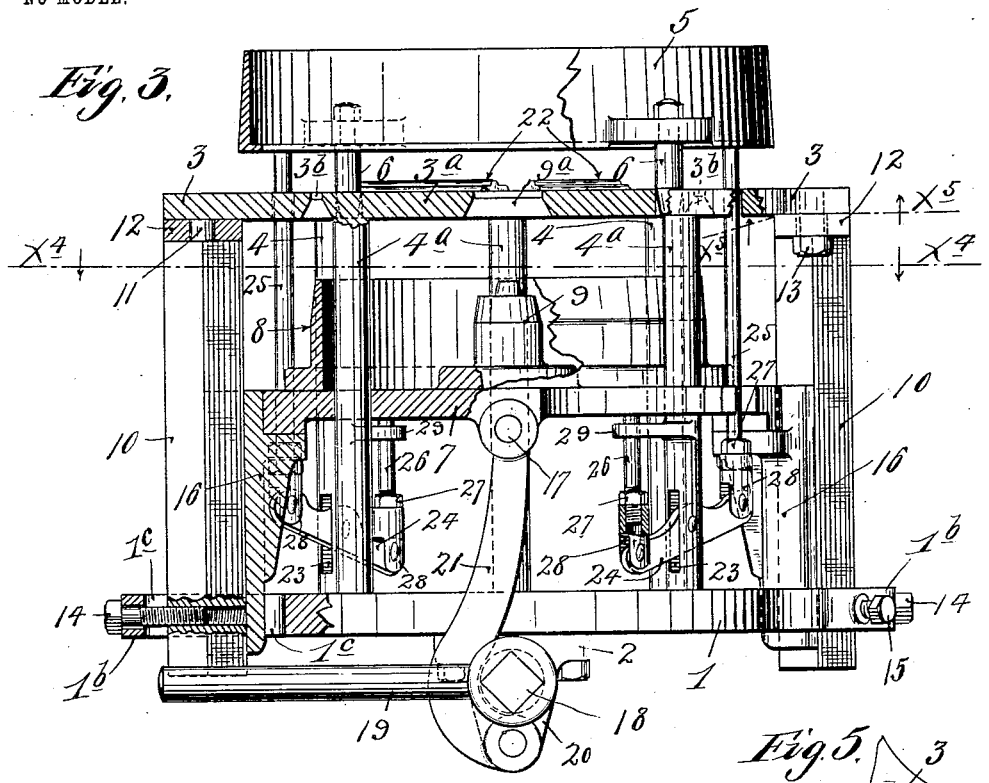
Figures 4, 5:
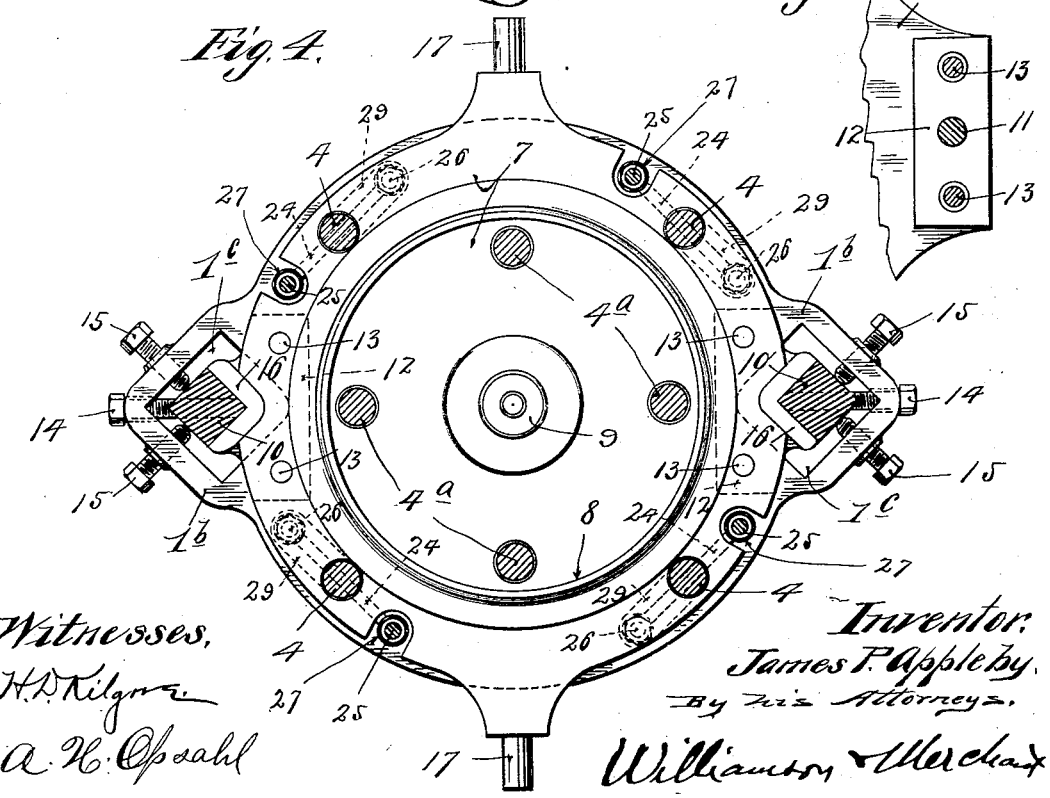

Figure 1 is a plan view of the complete machine. Fig. 2 is a side elevation of the same. Fig. 3 is a view, principally in vertical section, on the line $x^3$ $x^3$ of Fig. 1, but with some parts left in full side elevation. Fig. 4 is a horizontal section on the line $x^4$ $x^4$ of Fig. 3; and Fig. 5 is a detail in horizontal section on the line $x^5$ $x^5$ of Fig. 3, some parts being broken away.

The numeral 1 indicates a suitable bed-plate, shown as supported by legs $1^a$ and provided with bearings 2. At diametrically opposite points and at ninety degrees distant from the bearings 2 the bed-plate 1 is formed with rectangular yokes or extensions $1^b$, just inward of which are rectangular perforations or clearance-passages $1^c$.

The stripper-plate or moldboard is made up of two sections 3 and $3^a$, the outer of which sections 3 is conveniently supported from the bed-plate 1 by four vertical posts or rods 4, while the inner section $3^a$ is also conveniently supported from said bed-plate in a similar manner by four posts or rods $4^a$. The said inner section $3^a$ is in the form of a disk and is located concentric to a circular opening in said section 3, thereby leaving between them an annular passage $3^b$, through which the rim of the pulley-forming pattern hereinafter to be noted is adapted to be freely passed.

The numeral 5 indicates an ordinary flask, as shown, of circular form and provided with depending dowel-pins 6, which work in suitable seats in the stripper-plate section 3.

The numeral 7 indicates a horizontally-extended and vertically-movable pattern-plate, upon which is rigidly secured in any suitable way an annular rim-forming pattern 8 and a hub-forming pattern 9, the former of which is adapted to work upward through the annular space $3^b$, above noted, and the latter of which works through a suitable perforation $9^a$, formed at the center of the stripper-plate section $3^a$. The pattern-plate 7 is guided for true vertical movements by a pair of vertical guide-columns 10, which are preferably square in cross-section and which at their upper ends are provided with trunnions 11, which fit in seats formed in anchoring-brackets 12, rigidly but adjustably secured to the stripper-plate section 3 by machine-screws 13. The connections between the upper ends of said guide-columns 10 and the stripper-plate section 3 are preferably the same as those disclosed in my prior patent above identified. For connecting the depending or lower ends of the said guide-columns 10 to the bed-plate 1 I provide devices which I believe to be entirely novel. The lower ends of said guide-columns 10 project with clearance around them down through the passages $1^c$ in said plate 1, and each is connected by a so-called "pulling-screw" 14 to the outer portion of the corresponding yoke $1^b$ of said plate 1. These screws 14 turn loosely, or, in other words, are swiveled in the said yokes $1^b$ and work with screw-threaded engagement in seats formed in the said posts 10, as best shown in Fig. 3. Coöperating with each pulling-screw 14 is a pair of pushing-screws 15, which work with screw-threaded engagement through the yoke $1^b$ and impinge against the opposite intersecting outer faces of the said posts 10. As is evident, the said pulling-screws 14 keep the lower ends of the guide-columns 10 drawn outward tightly against the so-called "push-screws" 15, (which latter act as stops,) and thus rigidly but adjustably hold the lower ends of the columns 10, but leave their intersecting inner faces unobstructed and free. By screwing the coöperating pushing-screws 15 the one inward and the other outward the depending ends of the columns 10 may be adjusted laterally or tangentially to a circle struck from the axis of the plates 1 and 7. On the other hand, by adjusting both screws 15 equally and in the same direction—that is, both inward or both outward— and by correspondingly adjusting the coöperating screw 14 the depending ends of said guide-columns 10 may be adjusted radially or toward and from the axis above noted. The upper ends of the said guide-columns 10 may be adjusted as in my said prior patent. To the opposite sides of the pattern-plate 7 are rigidly secured long depending guides or keepers 16, formed with right-angle grooves, which closely engage the intersecting inner faces only of the guide-columns 10. These guides or keepers 16 are adapted to work on the guide-columns 10 down to or even below the lower extremities of said columns, and it will be noted that the clearance-passages 1ᶜ permit such movements. It will also be noted that the screws 14 and 15 do not form obstructions or in any wise limit the downward movements of the said guides or keepers 16. In fact, the said keepers or guides might work downward below the said screws and through the bed-plate 1 much farther than illustrated in the accompanying drawings.

Projecting from the opposite sides of the pattern-plate 7, ninety degrees distant from the guides 16, are trunnions 17. A rock-shaft 18 is loosely journaled in the bearings 2 (heretofore noted) and is provided at one end with a lever 19, by means of which it may be rocked by hand or otherwise. Just outward of the bearings 2 the shaft is provided with a pair of cranks 20, which are connected to the trunnions 17 on the pattern-plate 7 by links 21.

The annular rim 8 and hub 9, respectively, are adapted to form the rim and hub of the pulley which is to be cast. The spokes of the pulley may be conveniently formed by curved pattern-strips 22, secured on the face of the stripper-plate section 3ᵃ by dowel-pins or in any other suitable way. The device described is of course adapted to form but one-half of a pulley. As is evident, the pattern-sections 8 and 9 are moved upward into operative positions, as illustrated in Fig. 2, or downward into inoperative positions (indicated in Fig. 3) by oscillating the rock-shaft 18. When the said pattern-sections are drawn downward through the stripper-plate, they are of course drawn from the sand with a true or straight-line movement. In many classes of work it is also very desirable that the flask be raised from those portions of the pattern which are carried by the stripper-plate with a true vertical or straight-line movement. Means for accomplishing this result have hitherto been provided; but as one of the features of my present invention I provide a materially-improved device for accomplishing the above result. In the most approved manner of applying these flask-lifting devices the lower portions of the posts 4 are slotted, as shown at 23, and short levers 24 are passed therethrough and pivoted at their intermediate portions to the bifurcated portions of said posts.

The numeral 25 indicates relatively long and the numeral 26 relatively short plungers, screw-threaded at their lower ends, provided with lock-nuts 27 and screwed into heads 28. The heads 28 are preferably bifurcated and are pivoted one to each end of the coöperating lever 24. The long plungers 25 work through suitable seats in the stripper-plate sections 3 and engage the under rim portion of the flask 5. The short plungers 26 work upward through seats in the lateral projections 29 of the posts 4, and their upper ends stand in position to be engaged by the pattern-plate 7 as it closely approaches the limit of its downward movement. By reference to Fig. 3 it will be seen that when the pattern-plate 7 is lowered to its extreme position the flask 5 is raised materially above the stripper-plate and those portions of the pattern supported by the stripper-plate. The longitudinally-adjustable rods for lifting the flask I believe to be broadly new. By adjusting either the long or the short plungers or rods the distance to which the flask will be raised may be varied. Nevertheless it is important that both of the said plungers or rods be adjustable, inasmuch as by the adjustments of both thereof both the distance which the flask will be raised and the time at which it will be raised may be varied, and the levers 24 may be always kept set for movements through the most efficient zones of action and may all be set in the same positions with respect to a horizontal plane.

The novel devices for adjusting the guide-columns 10 may of course be applied either to their upper or their lower ends, or to both ends for that matter, accordingly as circumstances may require. The long plungers 25, being much heavier than the short plungers 26, will return the parts of the flask-lifting devices to the normal positions (indicated in Fig. 2) whenever the pattern-plate 7 is raised.

It will, of course, be understood that the several features of my invention above described are capable of modification as to details of construction and are also capable of association with various other forms of molding-machines, all within the scope of my invention as herein set forth and claimed.

What I claim, and desire to secure by Letters Patent of the United States, is as follows:

1. In a molding-machine, the combination of a frame comprising a base or support and a stripper-plate, vertical guide-posts supported thereby, coöperating tension and compression devices for securing said guide-posts in position and for adjusting them laterally, said devices being applied to half-sections of said posts, leaving the other half-sections unobstructed, and a vertically-movable pattern-plate coöperating with said stripper-plate and having keepers or guides which engage the unobstructed faces of said guide-posts and are adapted to work past the said post-adjusting devices; substantially as described.

2. In a molding-machine, the combination of a frame comprising a base or support and a stripper-plate, vertical guide-posts, means for adjustably securing said posts to the frame, said means comprising coöperating pushing and pulling screws working through the base or support and engageable with one side of said guide-posts, and a vertically-movable pattern-plate coöperating with the stripper-plate and having guides or keepers working on the unobstructed faces of said guide-posts, substantially as described.

3. In a molding-machine, the combination with a frame including a stripper-plate and a base-plate having the laterally-bulged yokes 1$^b$ and clearance-passages 1$^c$, of the angular guide-posts 10 connected at their upper ends to said stripper-plate, and the pulling-screw 14 and pair of pushing-screws 15 working through each yoke 1$^b$ and adjustably but rigidly securing the ends of said guide-posts, as described, and the vertically-movable pattern-plate having the depending guides or keepers 16 engaging with the inner angular faces of said guide-posts and adapted to work downward through said clearance-passages 1$^c$.

4. In a molding-machine, the combination with a plate supporting a pattern, of a flask resting on said plate, and a flask-raising device comprising an oscillating lever, a longitudinally-adjustable plunger or rod pivoted to said lever and engageable with said flask, and a vertically-reciprocating part operating the said lever and adjustable to regulate the throw of said lever.

5. In a molding-machine, the combination with a frame involving a stripper-plate, of a flask normally resting on said stripper-plate, a vertically-movable pattern-plate carrying a pattern which works through said stripper-plate, and a flask-raising device comprising an intermediate lever, and relatively long and short plungers connected to the ends of said lever, the former engaging with said flask and the latter engaged by said pattern-plate, when said pattern-plate is lowered, both of which plungers are longitudinally adjustable, substantially as described.

6. In a molding-machine, the combination with a frame involving a stripper-plate, of a flask normally resting on said stripper-plate, a vertically-movable pattern-plate carrying a pattern which works through said stripper-plate, and means for raising said flask when said pattern-plate is lowered, involving the levers 24, the heads 28 pivoted to the end of said levers, the relatively long and short plungers 25 and 26, respectively, having screw-threaded engagement with said heads 28 and suitably guided at their upper ends and engageable, respectively with said flask and with said pattern-plate, and the lock-nuts 27 on the said plungers, substantially as described.

In testimony whereof I affix my signature in presence of two witnesses.

JAMES P. APPLEBY.

Witnesses:
ELIZABETH H. KELIHER,
F. D. MERCHANT.